(12) United States Patent
Lutz et al.

(10) Patent No.: US 6,592,465 B2
(45) Date of Patent: Jul. 15, 2003

(54) METHOD AND APPARATUS FOR MONITORING OBJECTS IN FLIGHT

(75) Inventors: Mitchell E. Lutz, Fairhaven, MA (US); William Gobush, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 100 days.

(21) Appl. No.: 09/921,857

(22) Filed: Aug. 2, 2001

(65) Prior Publication Data

US 2003/0027655 A1 Feb. 6, 2003

(51) Int. Cl.⁷ .................. H04N 5/228; G06F 151/00
(52) U.S. Cl. .................. 473/198; 348/208.14
(58) Field of Search .................. 473/198, 199, 473/406, 407, 409, 131; 348/208.14

(56) References Cited

U.S. PATENT DOCUMENTS

| | | | |
|---|---|---|---|
| 4,158,853 A | * | 6/1979 | Sullivan et al. |
| 5,228,697 A | * | 7/1993 | Gulick et al. ............... 273/213 |
| 5,471,383 A | * | 11/1995 | Gobush et al. ............. 364/410 |
| 5,989,135 A | * | 11/1999 | Welch ....................... 473/353 |
| 6,398,670 B1 | * | 6/2002 | Engelhardt et al. .......... 473/407 |
| 2001/0043757 A1 | * | 11/2001 | Asakura .................... 382/289 |
| 2002/0103035 A1 | * | 8/2002 | Lindsay ..................... 473/151 |
| 2002/0173364 A1 | * | 11/2002 | Boscha ...................... 473/131 |
| 2002/0173367 A1 | * | 11/2002 | Gobush et al. ............. 473/197 |

* cited by examiner

Primary Examiner—Thomas N. Moulis

(57) ABSTRACT

The present invention relates to a methods and apparatus for monitoring objects, such as golf balls, in flight. The methods include providing a plurality of cameras with different orientations with respect to the object's flight path. For example, two cameras can be located downstream of the object's initial position on either side of the flight path and a plurality of other cameras can be located upstream of the object's initial position on one side of the flight path. With such an arrangement, data in three-dimensions can be obtained on the object. Furthermore, the methods can include providing an object with a material for emitting light when excited. For example, a phosphorescent material can be used to provide an object with high contrast as compared to a background that the object is imaged against. With such materials, the methods can include filtering so that the cameras use only light emitted by the object to form images of the object that will be analyzed. The present invention also relates to apparatus incorporating the components used in these methods.

36 Claims, 9 Drawing Sheets

METHOD AND APPARATUS FOR MONITORING OBJECTS IN FLIGHT

FIELD OF THE INVENTION

The present invention relates to a method and apparatus for monitoring objects in flight and more particularly, the invention is directed to a method and apparatus for monitoring objects with high contrast as compared to a background and for monitoring such objects for a significant amount of the object's flight. The present invention is also directed to a method and apparatus for monitoring objects in three-dimensions if desired.

BACKGROUND OF THE INVENTION

Methods and apparatus for measuring flight characteristics of an object, such as a golf ball, are known. Some of these methods and apparatus are used to determine an angle, spin rate and speed of the ball at launch. Some of these apparatus use photodetectors to detect a golf ball position shortly after impact or launch and to trigger a flash that allows a camera to take a photograph. Such methods and apparatus are disclosed in U.S. Pat. No. 4,063,259. This data is typically referred to as the ball's "launch conditions" because this data accompanies the launch of the ball. Such data is collected over a short time significantly less than a second and a short distance significantly less than a yard.

The total travel distance of a golf ball includes its carry distance and its roll distance. The carry distance extends from where the ball leaves a tee or the ground to where it initially contacts the "ground" after flight. The roll distance includes the distance from where the ball contacts the ground to where it comes to a complete stop after rolling or bouncing. The total travel distance can range from about 50 yards to about 300 yards depending on the shot. Prior art apparatus, such as that disclosed in the '259 patent, only measure the golf ball's launch conditions over less than a yard excluding the golf ball's characteristics over a significant portion of the ball's total travel distance. Such apparatus use launch condition data to predict total travel distance and ball trajectory.

Other patents disclose measuring the golf ball along other portions of the ball flight. U.S. Pat. No. 5,471,383 discloses measuring instantaneous velocity and spin but does not determine the ball's characteristics over a significant amount of the total travel distance.

Furthermore, the golf ball's flight has a horizontal component, a vertical component, and a depth component. Most prior art devices measure each component separately or the horizontal and vertical components together. U.S. Pat. No. 4,136,387 discloses taking images from three orientations but only for launch conditions, again excluding a significant amount of the total travel distance of the ball.

Additionally, conventional monitors are designed for use outdoors in daylight or in well-lit large rooms. When used outdoors in daylight, the ball flies across a background (i.e., sky) that may offer little contrast to the ball. In order to take useful images of the ball in flight in these conditions, some prior art monitoring devices are designed for use with golf balls having contrasting areas formed thereon. These areas can be about the size of some dimples. One drawback to using such a method is that the contrasting areas must be placed precisely on the ball, which can be time consuming. More importantly in order for cameras to see such areas to form images, light must be emitted along the camera's line of sight and be reflected off of the areas back to the camera. Since the ball is fast moving and these reflecting areas are relatively small, it is difficult if not impossible to obtain such images over more than a short distance of less than about a yard.

Another device for use in daylight is disclosed in U.S. Pat. No. 5,342,051. The '051 patent predicts where a ball would fly and a single camera tracks the predicted flight and purportedly captures the ball image. If the ball does not follow the predicted path, the necessary data may not be obtained.

Therefore, a need exists for a method and apparatus for monitoring preferably a significant amount of the total travel distance of a golf ball, particularly outdoors, that offers high-contrast, does not require placing small contrasting areas on the ball, and that, if desired, can measure horizontal, vertical and depth components of the ball's flight.

SUMMARY OF THE INVENTION

The present invention is directed to method of monitoring an object in flight. This method includes providing at least a portion of an outer surface of the object with a phosphorescent material and exciting the phosphorescent material so that the phosphorescent material emits light. The method further includes the steps of providing at least one camera, launching the object in flight, transmitting the light toward the at least one camera so that the at least one camera captures at least one image of the object in flight, and determining data for the object in flight using the at least one image of the object. More preferably, between at least two and ten images are taken by each camera.

The present invention is also directed to a method of monitoring an object in flight that includes providing an object in a stationary position and providing at least two cameras. One of the cameras is positioned downstream of the object in the stationary position and the other is positioned upstream of the object in the stationary position. The method further includes launching the object from the stationary position into flight, capturing images of the object in flight at least until the object passes through an apex in flight using the cameras, and determining data for the object in flight using the images of the object.

Furthermore, the present invention is directed to a combination of an apparatus and an object that comprises at least one light-emitting object and at least one non-light emitting camera. The camera receives a light emitted from the object in a predetermined range of wavelengths and processes the light to produce at least one image of the object in motion.

The present invention is also directed to an apparatus for monitoring an object in flight that comprises at least one movable camera, at least one stationary camera, and at least two filters located to receive a light emitted from the object before transmission to the associated camera. The filters allow the light to enter the associated camera and the cameras capture at least one image of the object in flight.

The present invention may also be an apparatus for monitoring an object in flight that comprises at least one first camera, a second camera, at least one first filter, and a second filter. The first camera includes a first line of sight substantially perpendicular to a flight path of the object so that the first camera captures images of the ball along a substantial length of the flight path. The second camera includes a second line of sight angularly offset from the flight path of the object by less than about 90 degrees. Each first filter is associated with each first camera and located to receive a light emitted from the object before transmission to the associated first camera. The first filter allows the light to enter the associated first camera and allows the at least one first camera to capture at least one image of the object in flight. The second filter is located to receive a light emitted from the object before transmission to the second camera. The second filter allowing the light to enter the second camera and allows the second camera to capture at least one image of the object in flight.

The above methods and apparatus can be used to take images of the ball for over about 6 seconds of ball flight and over about 200 yards of flight distance and do not require the cameras to have a light thereon for emitting light toward the ball during ball imaging.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
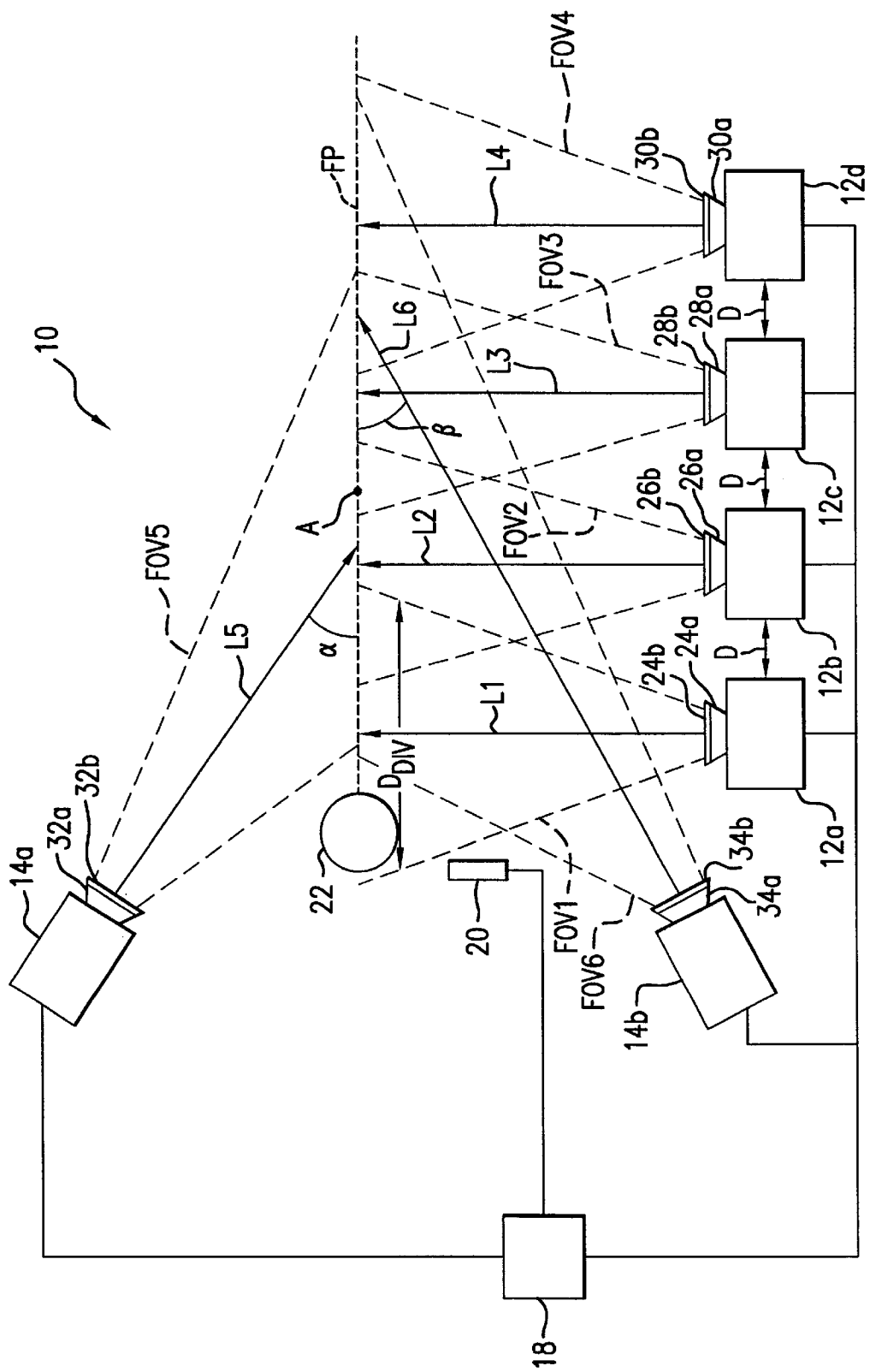
FIG. 1 is a schematic, plan view of an apparatus for monitoring a golf ball in three dimensions according to a first embodiment of the present invention, wherein the golf ball is in an initial position.

Referring to FIG. 1, monitoring apparatus 10 is shown. Apparatus 10 includes a plurality of side or longitudinally spaced cameras 12a–d, a left rear camera 14a, a right rear camera 14b, a computer 18, and a trigger 20. All of these components are disposed above the level of the turf.

The apparatus 10 monitors an object in flight, such as golf ball 22, which when launched has a flight path FP including an apex A. The side camera 12a includes a lens 24a and a filter 24b connected to the lens 24a. The side camera 12a is preferably selected and positioned so that it has a field-of-view represented by the lines FOV1, which preferably has a distance $D_{DIV}$ of at least about 50 yards at the divergent end. The side camera 12a has a line of sight L1 that is preferably substantially perpendicular to the golf ball flight path FP. In another embodiment, however, an angle between the ball flight path and the line of sight L1 of camera 12a can be unequal to 90 degrees as disclosed in U.S. Pat. No. 6,241,622 B1 incorporated by reference herein in its entirety.

The side camera 12b includes a lens 26a and a filter 26b connected to the lens 26a. The side camera 12c includes a lens 28a and a filter 28b connected to the lens 28a. The side camera 12d includes a lens 30a and a filter 30b connected to the lens 30a. The side cameras 12b–d are preferably selected and position so that they have fields-of-view represented by the lines FOV2, FOV3, and FOV4 respectively that preferably have a distance at the divergent end similar to camera 12a. The side cameras 12b–d also have lines of sight L2, L3, and L4, respectively that are preferably substantially perpendicular to the golf ball flight path FP. In another embodiment, however, angles between the ball flight path and the lines of sight L2–4 of cameras 12c–d, respectively, can be unequal to 90 degrees as disclosed in the '622 patent. In this manner, the plurality of side cameras 12a–d preferably collectively view substantially the entire flight of the ball and at least preferably ball flight from the initial position to the apex A. The filters are optional, but preferable.

The left rear camera 14a includes a lens 32a and a filter 32b connected to the lens 32a. The left rear camera 14a is preferably selected and positioned so that it has a field-of-view represented by the lines FOV5, which preferably has sufficient distance at the divergent end to view the apex A of the ball flight. As shown in FIG. 1, the left rear camera 14a is preferably downstream (i.e., to the rear) of the golf ball 22 in its initial position I. The left rear camera 14a has a line of sight L5 that is preferably angularly offset from the golf ball flight path FP at an angle α less than about 90 degrees. Moreover, the angle α can be from about 1 degree to about 90 degrees and more preferably about 5 degrees. The left rear camera 14a further includes a focal length established by calibration that sets the distance at which the camera can capture clear images.

The right rear camera 14b includes a lens 34a and a filter 34b connected to the lens 34a. The right rear camera 14b is preferably selected and positioned so that it has a field-of-view represented by the lines FOV6, which preferably has sufficient distance at the divergent end to view the apex of the ball flight. As shown in FIG. 1, the right rear camera 14b is preferably downstream (i.e., to the rear) of the golf ball 22 in its initial position I. The right rear camera 14b has a line of sight L6 that is preferably angularly offset from the golf ball flight path FP at an angle β less than about 90 degrees. Moreover, the angle β can be from about 1 degree to about 90 degrees and more preferably about 5 degrees.

In another embodiment, one or all of the filters 24b, 26b, 28b, 30b, 32b, and 34b can be spaced from and separate from the cameras 12a–d and 14a–b, respectively and aligned with their lenses 24a, 26a, 28a, 30a, 32a, and 34a, respectively. However, in the present embodiment, the filters 24b, 26b, 28b, 30b, 32b, and 34b are configured and dimension to be threadably secured the lenses although other means of securement such as tape, bonding, fasteners, and the like can also be used.

Preferably, the filters 24b, 26b, 28b, 30b, 32b, and 34b are interference pass filters centered at a predetermined range of wavelengths. More preferably, each filter allows a portion or predetermined range of wavelengths of light emitted from the ball 22 to pass therethrough as filtered light that enters the respective camera. Most preferably, the predetermined range of wavelengths for each filter is centered at about 520 nm, which is the wavelength for green light so that light from a phosphorescent pigment excited into the range including 520 nm can pass through the filter. Most preferably, useful filters are commercially available from Edmund Industrial Optics located in Barrington, N.J. under stock no. L43-121, 24.15 mm diameter.

Preferably, the cameras are selected so that a pigment used on the object is compatible with the quantum efficiency of the camera. More preferably, the cameras are electro-optical cameras with light-receiving silicon panels, even more preferably charge coupled devices (CCD) are preferred such as the CCD cameras manufactured by Sony under the name XC-55.

The computer 18 is commercially available and may include a monitor. The computer 18 is in electrical communication with the cameras 12a–d and 14a–b via cables and with the trigger 20 via a cable. The computer 18 includes generally a microprocessor, memory, and a frame grabber. The memory stores various software algorithms for controlling the microprocessor, frame grabber, and the cameras 12a–d and 14a–b. The computer 18 also collects and analyzed data for the object, as discussed below and calibrates the system.

The frame grabber allows the computer to store images from each camera, and preferably is capable of capturing images of the ball 22 at a rate of approximately about 30 frames per second. More preferably, the frame grabber is commercially available from Matrox Electronic Systems Ltd. located in Dorval, Quebec under the name Matrox Meteor II.

The trigger 20 may be an acoustical sensor such as a microphone, or a light sensor such as a laser beam. When the trigger is an acoustical sensor, upon activation by the sound of impact of a club with the ball the trigger starts the frame grabber in the computer 18 capturing images of the ball. When the trigger is a light sensor, upon activation by for example the ball breaking a light beam the trigger starts the frame grabber in the computer 18 capturing images of the ball.

Preferably, at least a portion of the outer surface, such as one hemisphere, of the ball 22 is provided with a light-emitting material. Any light-emitting material can be used. As a result, the light-emitting material is on a visible portion of the ball. Phosphorescent material emits light following exposure to and removal of incident radiation, also know as "glow in the dark" material. In an alternative embodiment, the entire outer surface of the ball 22 is provided with the phosphorescent material. In order for the phosphorescent material to emit light, the ball surface is excited. The excitation can occur by directing light such as ultraviolet or infrared light, a laser, or the like, at the object. Preferably, the excitation is done by directing ultraviolet light at the object, such light having a wavelength between about 200 nm and about 450 nm. Preferably, the luminescence or emission curve of the ball will be distributed over the wavelength range of about 470 nm to about 600 nm with an emission peak of 520 nm. The excitation duration of about 1 to about 3 hours with a selected material should emit light for an extended time of preferably about 3 to about 12 hours after excitation.

The light-emitting material, such as phosphorescent material, can be a pigment mixed into a cover layer material such as an ionomer blend. Then the cover layer can be formed out of the mixture. Other cover materials can also be used with the pigment, such as polyurethane and balata, and the present invention is not limited to covers formed of ionomer blends. Alternatively, the light-emitting material, such as phosphorescent material, can be a pigment incorporated into a paint that is coated on the outer surface of the ball. One preferable phosphorescent pigment is commercially available from United Mineral Corporation of Lyndhurst, N.J. under the name Luminova. Other preferable pigments are commercially available from United Mineral Corporation of Lyndhurst, N.J. under the name UVEDA®. The UVEDA® pigments useful are those with emission peaks within the recommended range and include emission colors indigo, blue, blue green, green, red, and orange. Additionally, the preferred pigment has a brightness after excitation of about 300 millicandels per square meter ($mcd/m^2$).

Figure 2:
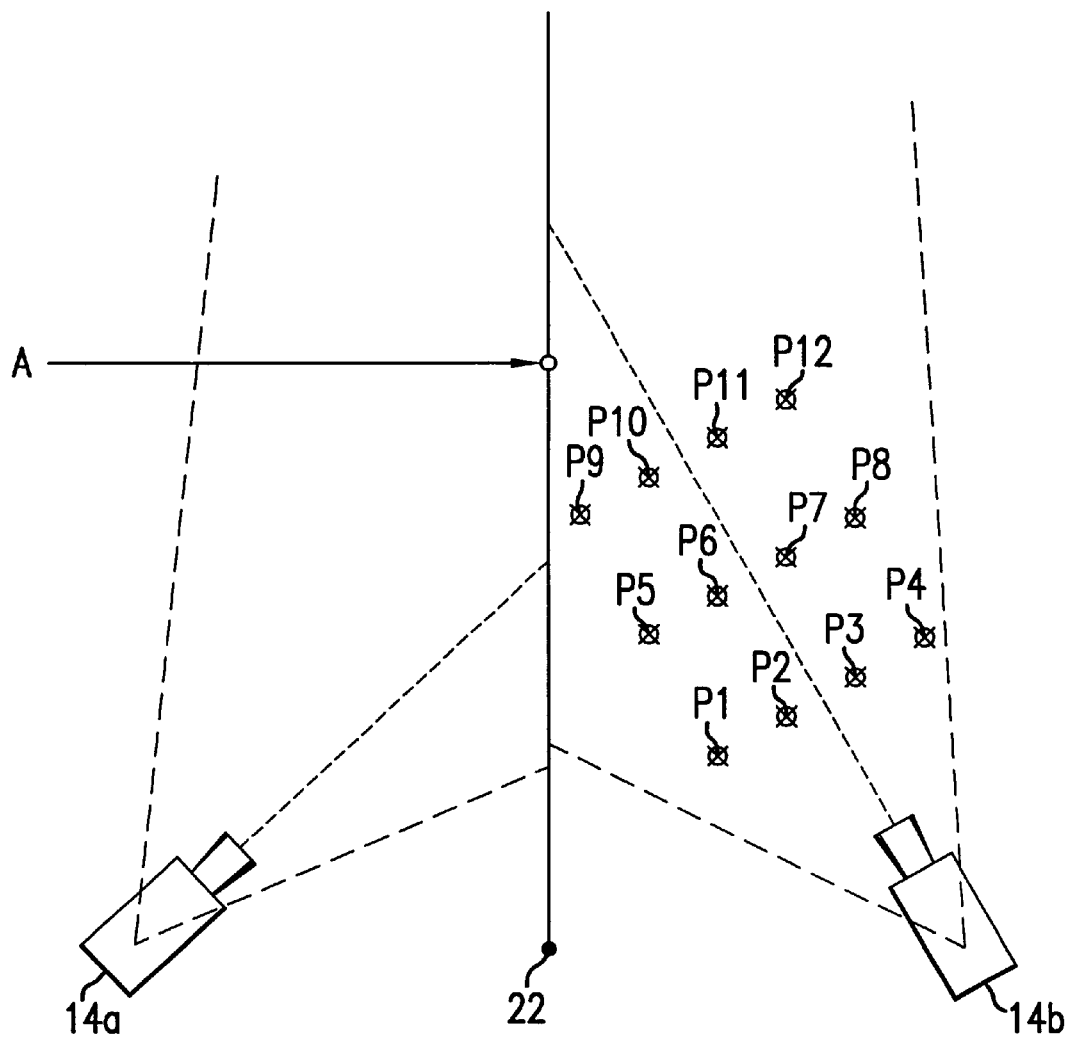
FIG. 2 is a partial, schematic, plan view of the apparatus of FIG. 1 during calibration of one camera of the apparatus.

Operation of the system 10 modified to include only rear cameras 14a and 14b as shown in FIG. 2 will now be discussed. This modified system is the preferred embodiment. The system is preferably used outdoors. It is also possible to perform the tests indoors, hitting into preferably a sand pit.

An operator starts the system and the system determines if this is the first time it has been used. By default, the system will use the last calibration when it is first activated. Therefore, the system should be calibrated after each time the system is moved and/or turned on.

The calibration, if necessary, determines each camera's global position in the test range, orientation, and focal length. The calibration of the system begins with setting up and aiming each of the cameras 14a–b. Each camera is preferably set up on level ground. The cameras can be equipped with base members that can be moved to reposition and level the camera as known by those of ordinary skill in the art. One such platform is disclosed in the '622 patent. Calibration further includes setting up a calibration element. In the preferred embodiment, the calibration element is a pole with a movable contrasting area thereon. The pole when set-up extends vertically upward from the ground. The pole preferably includes a pulley for moving the contrasting area along the pole's length when the pole is set up. The present invention is not limited to any particular calibration element configuration. Any calibration element that allows each camera to image a contrasting area thereon and also allows the area to be measured by a geodimeter can be used. Alternatively, the calibration element can be a fixture similar to that shown in the '383 patent, by modified as to size and number of contrasting areas to provide preferably 12 contrasting areas for each camera to image.

Calibration can be done separately for each camera by setting up the pole in each camera's field of view in at least six positions and more preferably in twelve positions. The locations of the pole for calibration of right rear camera 14b are shown in FIG. 2 as P1–P12. The positions P1–P12 are arranged in three rows and four columns. The pole is preferably positioned at least at positions P1–P6 and more preferably at positions P1–P12. In each position, the camera 14b takes an image of the contrasting area on the pole. The positions are in a three-dimensional configuration so that the camera can be calibrated in the vertical, horizontal, and depth dimensions. In each position, the contrasting area is located at a height using the pulley to simulate where the ball will be located during flight. The contrasting areas used may be retro-reflective and thus require the use of a light from a flash bulb aligned with the camera's line of sight but such a light is not necessary when imaging the ball. The camera being calibrated takes an image of the calibration element and sends the image to a buffer.

In one preferred embodiment, there is a single contrasting area per pole. However, in another embodiment there can be more than one contrasting area per pole at spaced vertical locations.

The system computer includes a calibration algorithm and determines the location of the centers of the areas in each image corresponding to the calibration element contrasting area. In one embodiment, the system locates the centers of these areas by identifying the positions of the pixels in the buffer that have a light intensity greater than a predetermined threshold value. Since the images are two-dimensional, the positions of the pixels have two components (x,y). The system searches the images for bright areas and finds the edges of each of the bright areas. The system then provides a rough estimate of the centers of each of the bright areas. Then all of the bright pixels in each of the bright areas are averaged and an accurate position and size of the area is calculated for all of the areas in each pole position. Those with areas smaller than a predetermined minimum area are ignored.

The X, Y, and Z coordinates of the center of each contrasting area at each of the positions P1–P12 are measured using a geodimeter and stored in the computer. A pole target is set at the future location of the tee as an origin of the coordinate system. The geodimeter is placed on a previously leveled stage or platform and aimed at the pole target. The geodimeter emits an infra-red light beam that is optically directed towards the pole target. The beam is reflected off of the contrasting areas on the pole target and received by the geodimeter. With the help of a comparator within the geodimeter, the phase delay between the emitted and received beam is measured. The time measurement of the phase delay is converted into a distance measurement in millimeters and displayed on a screen of the geodimeter and/or the computer. The origin measurement and the direction from which that measurement was taken are read into a microprocessor within the geodimeter, which creates a coordinate system. The geodimeter is then used to measure the locations of the contrasting area on the pole at the various positions P1–P12.

Using the geodimeter, the distance from the geodimeter to pairs of points, such as P1 and P2 is measured. The angle betweent the lines of sight from the geodimeter this pair of points is known. Using geometric relationships and these known values, the distance between the points and their relationship to the X, Y, Z coordinate system can be determined. A preferred geodimeter for use in this method is manufactured by Geotronics AB located in Sweden and sold under the name Geodimeter 420. The system recalls this stored data of the three-dimensional positions of the contrasting areas on the calibration element relative to one another.

Using the images of the calibration element in the various positions, the system determines eleven (11) constants relating the image space coordinates U and V from the cameras to the known twelve X, Y, and Z coordinate positions from the geodimeter. The equations relating the calibrated X(I), Y(I), Z(I) spaced points with the $U_1^j$, $V_1^j$ image points are:

$$U_i^j = \frac{D_{1j}X(i) + D_{2j}Y(i) + D_{3j}Z(i) + D_{4j}}{D_{9j}X(i) + D_{10j}Y(i) + D_{11j}Z(i) + 1}$$

-continued $$V_i^j = \frac{D_{5j}X(i) + D_{6j}Y(i) + D_{7j}Z(i) + D_{8j}}{D_{9j}X(i) + D_{10j}Y(i) + D_{11j}Z(i) + 1}$$

where i=1,12; j=1.

The eleven constants, $D_{i1}$ (i=1,12) are solved from knowing X(I), Y(I), Z(I) at the twelve locations and the twelve $U_1^j$, $V_1^j$ coordinates measured in the images taken by the one camera.

In another embodiment, during the image analysis the system uses the standard Run Length Encoding (RLE) technique to locate the bright areas. The RLE technique is conventional and known by those of ordinary skill in the art. Image analysis can occur during calibration or during an actual shot. Once the bright areas are located using the RLE technique, the system then calculates an aspect ratio of all bright areas in the image to determine which of the areas are the contrasting areas. The technique for determining which bright areas are the contrasting areas is discussed in detail below with respect to image analysis.

The remaining camera 14a must also be calibrated using a similar method. For this camera, the calibration element is positioned at the six to twelve positions and imaged. The position of each area is also measured by the geodimeter. Due to the overlapping fields-of-view of the cameras 14a–b, as shown in FIG. 2, it may be possible to position the pole where in one position both cameras are calibrated. This is possible if the two cameras can image the contrasting area in that position. As a result, the eleven constants, $D_{i1}$ (i=1,12) are solved for each camera 14a and 14b.

After calibration, the operator can enter the ambient conditions, including temperature, humidity, wind, elevation, and turf conditions. Next, the operator inputs data about the launching device used. Commercially available launching devices such as a mechanical golfer available from True Temper Corporation can be used. In addition, an Ultra Ball Launcher manufactured by Wilson® Sporting Goods Co., a golfer, or the like can also be used to launch the ball. By way of example, if a golfer is used the operator enters information about the golfer, including the golfer's name, the test location, gender, age and the golfer's handicap. The operator also identifies the golf ball type and club type, including shaft information, for each test.

In preferably "low light" conditions, such as after sunset or in a dark room, the ball 22 is launched along its flight path FP with a particular known speed, spin and launch angle. In this specification and appended claims "low light" means less than about 1000 lumens/ft$^2$. The trigger 20 upon the proper stimulus causes the frame grabber to capture images of the ball 22 in flight from cameras 14a–b. Preferably the frame grabber is set-up to capture between about two and about 10 images of the ball per camera so that the resulting images look substantially continuous. The light emitted from the ball after filtering contacts a sensor panel within the cameras, and forms a corresponding image of the ball thereon. The cameras 14a and b preferably simultaneously capture images of the ball in real time using "genlocking." "Genlocking" means that all of the cameras are in synchronization or capturing the same scene at the same time. This is accomplished by establishing a master/slave relationship between genlocked cameras using computer control of the cameras as known by those of ordinary skill in the art. These images on the panel can be stored in a video file in for example an AVI format or as still images in a JPG format or the likes. When the phosphorescent ball is imaged against the "low light" background, there is high contrast between the ball and the background, which enhances resolution.

These images can be subsequently played back, overlaid on other images, averaged or otherwise analyzed. The computer can subtract two adjoining images to negate any background stationary object such as a celestial object. This is a digital means of filtering such objects. Alternatively, such objects can be filtered using additional filters in front of each camera lens. This filtering of background objects step is optional but makes subsequent analysis faster.

Using the known ball 22 dimensions, the known time between camera images capture and the known geometric relationships between the cameras, the computer via software is able to calculate the X, Y and Z positions of each ball image, which is essentially a single dot in a common coordinate system at the time of each snapshot. From the position information and the known data, the computer is able to calculate the ball velocity and spin in three dimensions during flight. Given the initial velocity and spin, plus known aerodynamic characteristics of golf ball 22, the computer is also capable of accurately predicting the flight path and point of landing of the ball if this portion of the flight is not imaged.

Three-dimensional monitoring of golf ball 22 is accomplished by representing the X, Y, Z position of the ball by its center of mass location $T_x$, $T_y$, $T_z$. The resulting equations to be solved given the camera coordinates $U_1^j$, $V_1^j$ for each ball image, i, and two cameras, j, are as follows:

$$U_1^j = \frac{D_{1j}T_x^{(i)} + D_{2j}T_y^{(i)} + D_{3j}T_z^{(i)}D_{4j}}{D_{9j}T_x + D_{10j}T_y + D_{11j}T_z + 1}$$

$$V_1^j = \frac{D_{5j}T_x^{(i)} + D_{6j}T_y^{(i)} + D_{7j}T_z^{(i)} + D_{8j}}{D_{9j}T_x^{(i)} + D_{10j}T_y^{(i)} + D_{11j}T_z^{(i)} + 1}$$

The velocity components of the ball along the three axes of the coordinate system are then computed from the formulas:

$$V_x^{(i)} = \frac{T_x^{(i)}(t + \Delta T) - T_x^{(i)}(t)}{\Delta T}$$

$$V_y^{(i)} = \frac{T_y^{(i)}(t + \Delta T) - T_y^{(i)}(t)}{\Delta T}$$

$$V_z^{(i)} = \frac{T_z^{(i)}(t + \Delta T) - T_z^{(i)}(t)}{\Delta T}$$

in which $\Delta T$ is the time interval between images taken.

The spin and spin decay rate can only be determined if only a portion of the ball has the phosphorescent material not the entire ball. The image of the ball would be blinking on the video due to the partial material coverage. From the blinking frequency the total spin rate can be estimated. Thus, by collecting many frames, the frequency change in the gray level of the ball would give the spin rate. Spin decay rate is the change in spin over time. The system can also calculate velocity decay rate. Velocity decay rate is the change in velocity over time. In order to determine velocity decay rate or spin decay rate, at least two velocity or spin values must be calculated.

In addition, the apparatus can be used to determine, for example, the object's position, flight time and/or distance, roll time and/or distance, and dispersion. Dispersion is the statistical measure of ball landing distance from an average landing location. Once the average landing location is determined, dispersion can be easily found by calculating the variation in ball landing distance from this averaged landing location.

Figure 3:
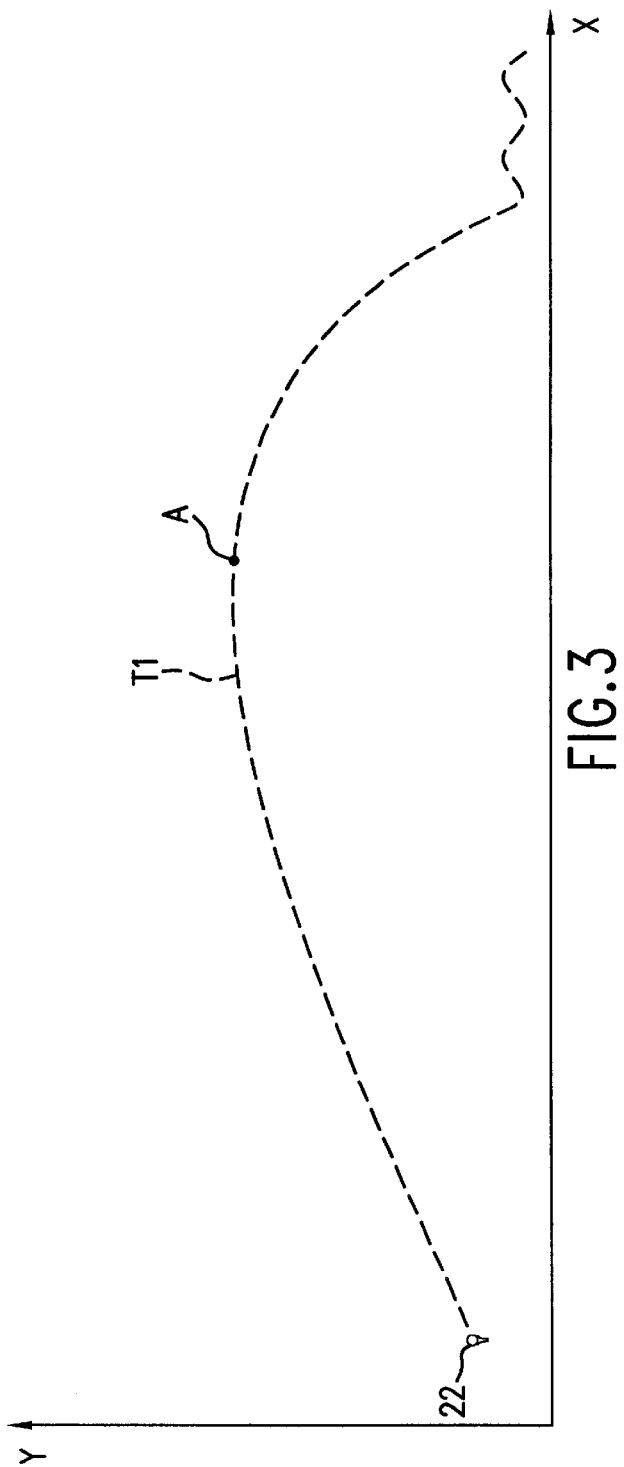
FIG. 3 is a schematic, elevational view of a trajectory in an x-y plane as measured by the apparatus of FIG. 1.
Figure 4:
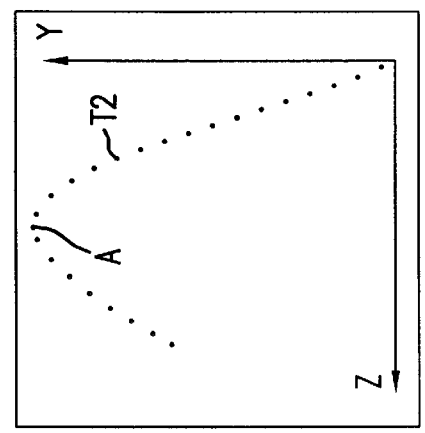
FIG. 4 is a schematic, elevational view of the trajectory in an y-z plane as measured by the apparatus of FIG. 1.

Position data determined can be used to determine the three-dimensional shape of the ball's trajectory. If only two-dimensional information is desired, the rear cameras can be used without the side cameras (as shown in FIG. 1) or vice versa. The trajectory can be displayed in 3-D using a video format or in two dimensions as shown in FIG. 2 and 3. Referring to FIG. 2, a two-dimensional trajectory such as may be obtained from the cameras 12a–d is shown in the x-y plane. Referring to FIG. 3, a two-dimensional trajectory obtainable from the rear cameras 14a–b is shown in the y-z plane.

The cameras are positioned so that a significant amount of the ball's total flight distance is captured. If less than all of the total flight distance is captured, the computer can extrapolate from the known data to determine the final impact position, time and roll distance using methods, well known by those of ordinary skill in the art.

The results can be stored in a data file. The operator then determines whether an additional test will be performed. If additional tests are to be performed, the process described above repeats, beginning with launching and the sound trigger through the computation and presentation steps.

When all tests have been performed, the system 10 may compute statistics for each golf ball type used in the tests and presents the results to the operator. Upon request from the operator, the system displays the test results in various forms. For example, the system will display results by the golf ball type selected by the operator. Similarly, the system can also display tabular representations of the trajectories for the golf ball types selected by the operator. The tabular representation may present trajectory information including distance, height, velocity, and spin. Similarly, the system can display a graphical representation of the trajectories for the golf ball types selected by the operator. The system may also display the average of each of the shots or launches. The results are displayed in a tabular and/or graphical format. The displayed results include the total distance, the spin rate, the launch angle, carry distance, roll distance, and golf ball speed.

Since the data is saved, when the system is in the test mode, it is also possible to compare the data with that of other test sessions. Similarly, the system may compare the data from successive clubs (e.g., a 5-iron to a 6-iron to a 7-iron) to determine whether there are gaps in the clubs (inconsistent distances between each of the clubs) whether a mechanical golfer or actual golfer are used to launch the ball. Alternatively, two different golfers could be compared using the same or different clubs, or the same or different balls.

Referring to FIG. 1, the side cameras 12a–b monitor the flight of the ball longitudinally (in the X-direction as shown in FIG. 3). The rear cameras 14a–b have focal lengths sufficient for cameras 14a–b to obtain clear images of the ball before during and after the apex of flight. Cameras 14a–b monitor the rear trajectory and can obtain dispersion data. In an alternative embodiment, a front camera can be added to obtain roll data on the ball after impacting the ground.

Figure 5:
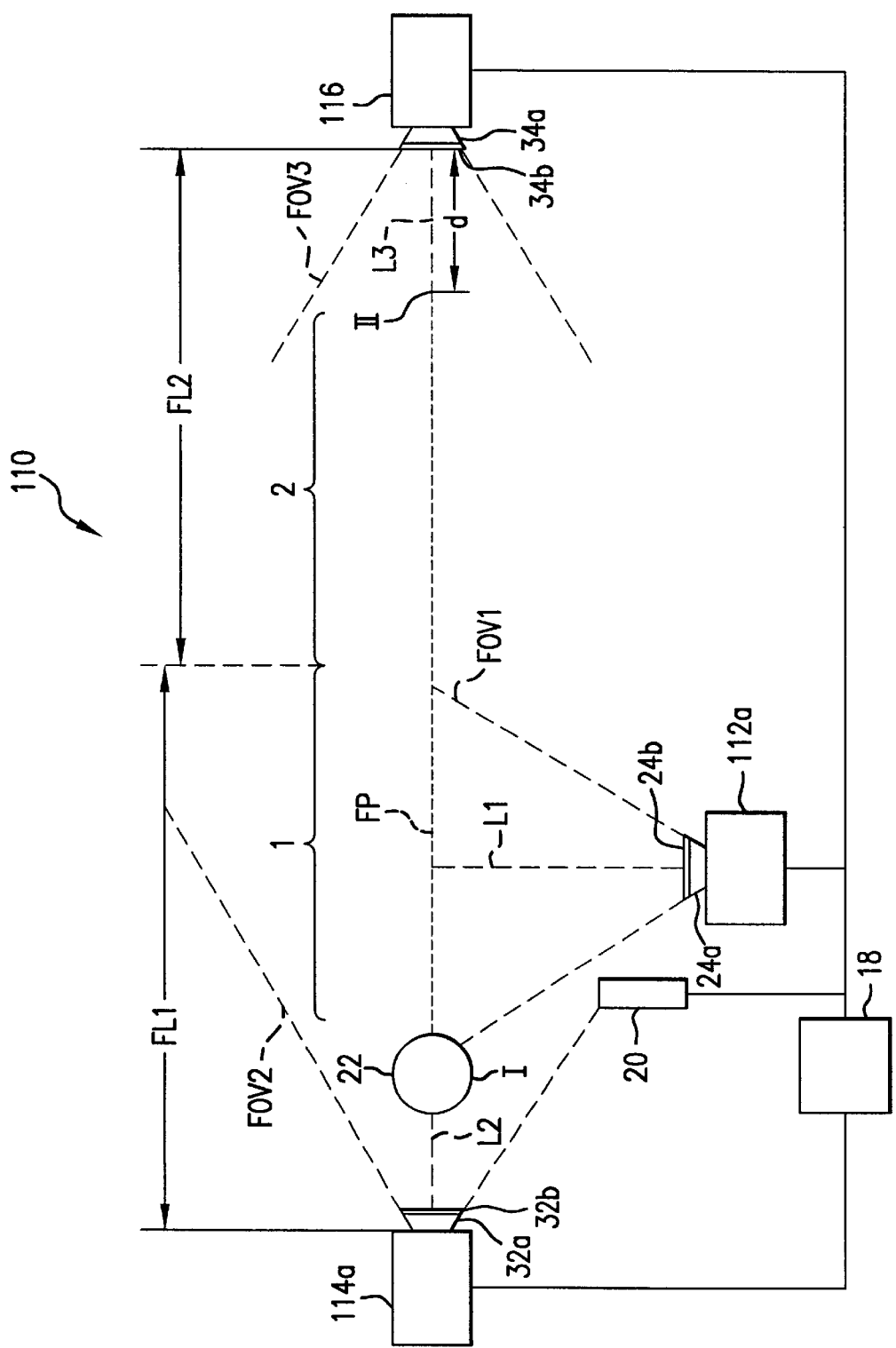
FIG. 5 is a schematic, plan view of an apparatus for monitoring a golf ball in three dimensions according to a second embodiment of the present invention, wherein the golf ball is in an initial position.

Referring to FIG. 5, an alternative apparatus 110 is shown. The apparatus 110 is similar to apparatus 10 and further includes a single side camera 112a oriented similarly to camera 12a, a single rear camera 114a, and a front camera 116. The cameras 112a, 114a and 116 are similar to those discussed above.

The rear camera 114a is preferably selected and positioned so that it has a field-of-view represented by the lines FOV2. As shown the rear camera 114a is downstream of the golf ball 22 in its initial position I. The rear camera 114a has a line of sight L2 that is preferably substantially parallel to the golf ball flight path FP or preferably substantially perpendicular to the line of sight L1 of the first camera 112a. More preferably, the second line of sight L2 is aligned with the flight path FP. The rear camera 114a has a focal length FL1 sufficient for camera 114a to obtain clear images of the ball along the first portion 1 of the flight path.

The front camera 116 is selected and positioned so that it has a field-of-view represented by the lines FOV3. As shown the front camera 116 is upstream of the golf ball 22 in its final position II. Preferably, there is a distance d between the maximum potential final position II and the front camera 16 of about 5 yards. The front camera 116 has a line of sight L3 that is preferably substantially parallel to the golf ball flight path FP, and more preferably aligned with the flight path FP. The front camera 116 has a focal length FL2 sufficient for camera 116 to obtain clear images of the ball along the second portion 2 of the flight path.

The system 110 is calibrated and operated similar to system 10 discussed above. Front camera 116 preferably captures images of the ball when it lands and rolls. Camera 114a monitors the rear trajectory and can obtain dispersion data. The front camera 116 monitors the front trajectory and can obtain dispersion and roll data.

In an alternative embodiment, the front camera 116 can be eliminated if the rear camera 114a has a zoom feature to change its focal length FL1 so that camera 114a can track the ball's flight along the first and second portions 1 and 2 of the flight path FP.

Figure 6:
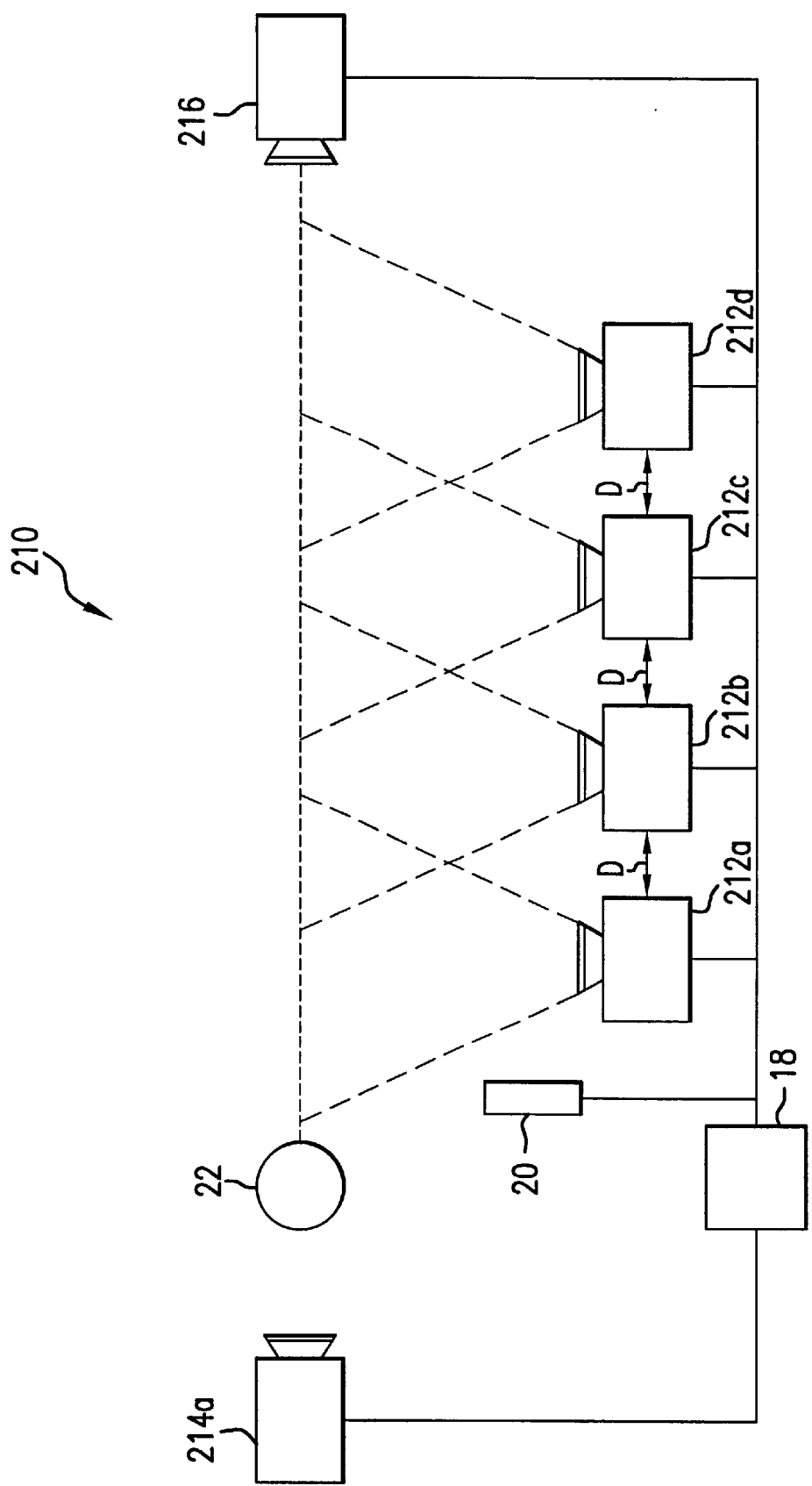
FIG. 6 is a schematic, plan view of an apparatus for monitoring a golf ball in three dimensions according to a third embodiment of the present invention, wherein the golf ball is in the initial position.

Referring to FIG. 6, an alternative apparatus 210 is shown. The apparatus 210 includes a plurality of side cameras 212a–d similar to system 10 and includes rear and front cameras 214a and 216, respectively, is similar to apparatus 110. The system 210 is calibrated and operated similar to system 10 discussed above. When the golf ball 22 is launched, rear and front cameras 214a, 216 and side cameras 212a–d are triggered and images of the ball are captured by the cameras. Since there are three or more side cameras 212a–d, in addition to the data gathered above, velocity decay and spin decay rates can be obtained.

Figure 7:
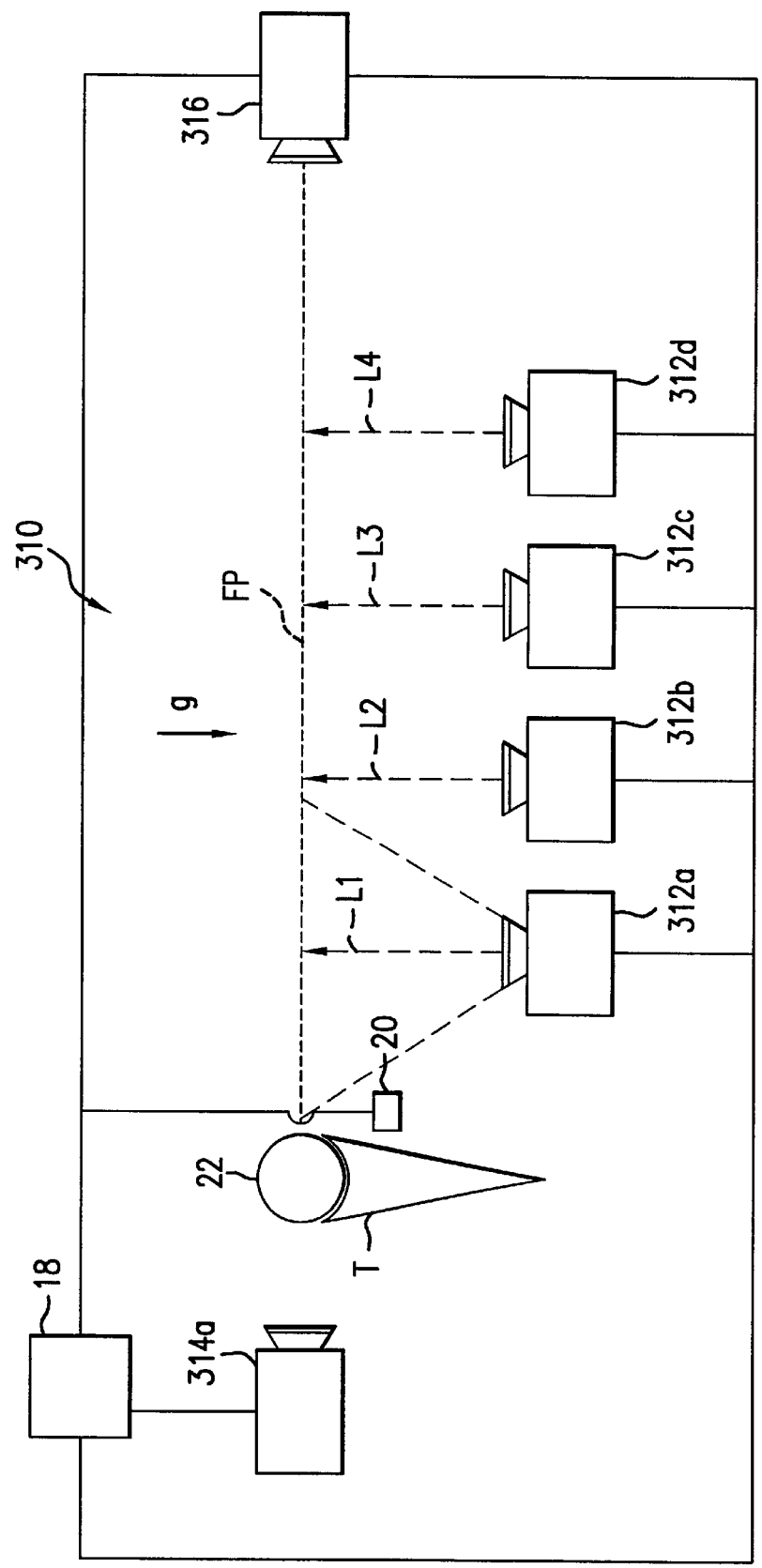
FIG. 7 is a schematic, elevational view of an apparatus for monitoring a golf ball in three dimensions according to a fourth embodiment of the present invention, wherein the golf ball is in an initial position.

Referring to FIG. 7, an alternative embodiment of the apparatus 310 is shown. The apparatus 310 is similar to apparatus 210 and further requires that the longitudinally spaced cameras 312a–d are disposed such that the lines of sight L1–4 preferably extend in the direction opposite a gravity vector, labeled g. Alternatively, the lines of sight L1–4 can be angled with respect to the gravity vector, but the lines of sight still extend upward from the ground.

Figure 8:
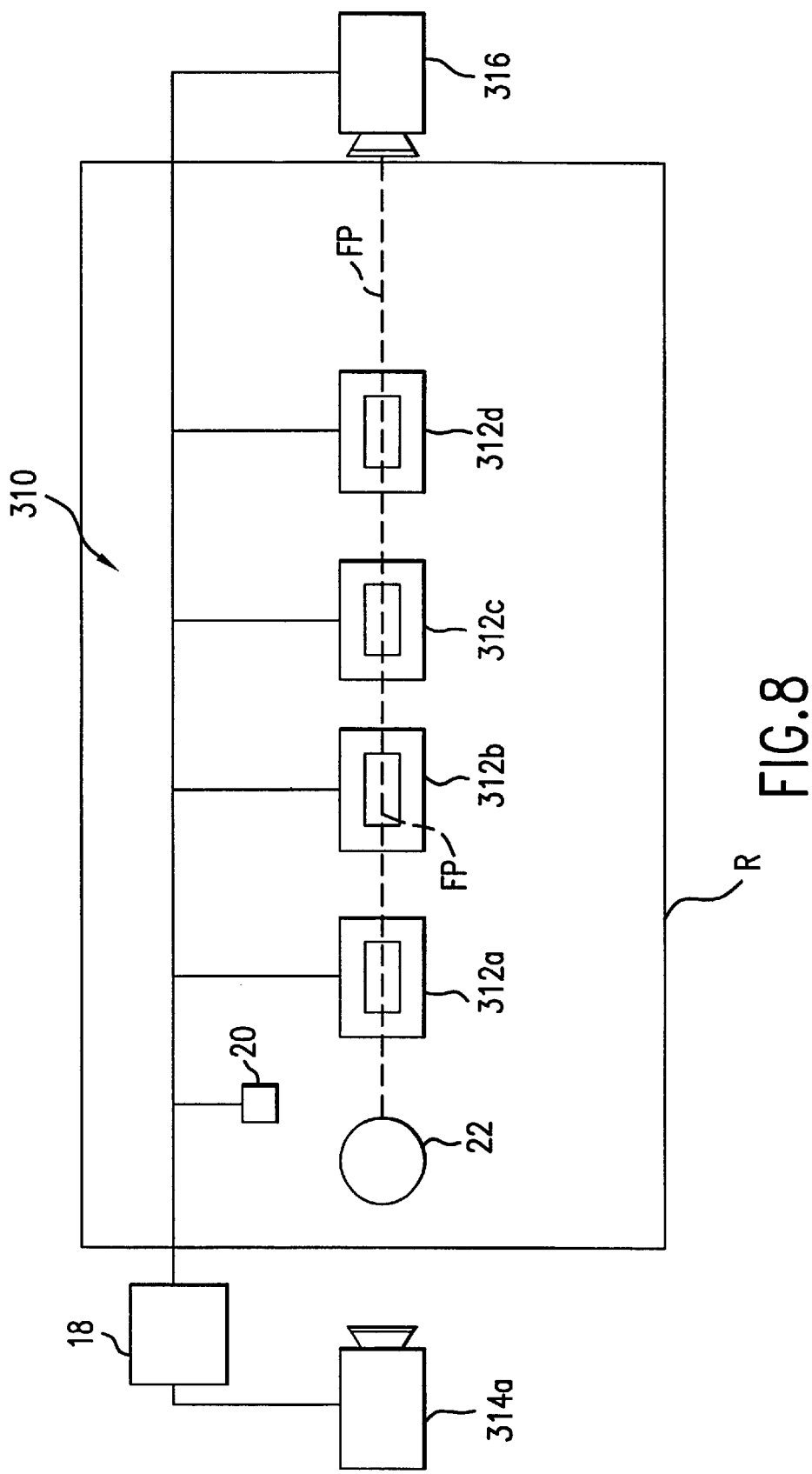
FIG. 8 is a schematic, plan view of the apparatus of FIG. 7.

As shown in FIG. 8, the cameras 312a–d are centrally located within the test range R. The golf ball 22 may be supported by a tee T (as shown in FIG. 7) or by the turf. The system 310 is calibrated and operated similar to system 10 discussed above. When the golf ball 22 is launched, rear and front cameras 314a, 316 and cameras 312a–d are triggered and images of the ball are captured by the cameras. With three or more longitudinally extending cameras 312a–d, in addition to the data gathered above, velocity decay and spin decay rates can be obtained.

Figure 9:
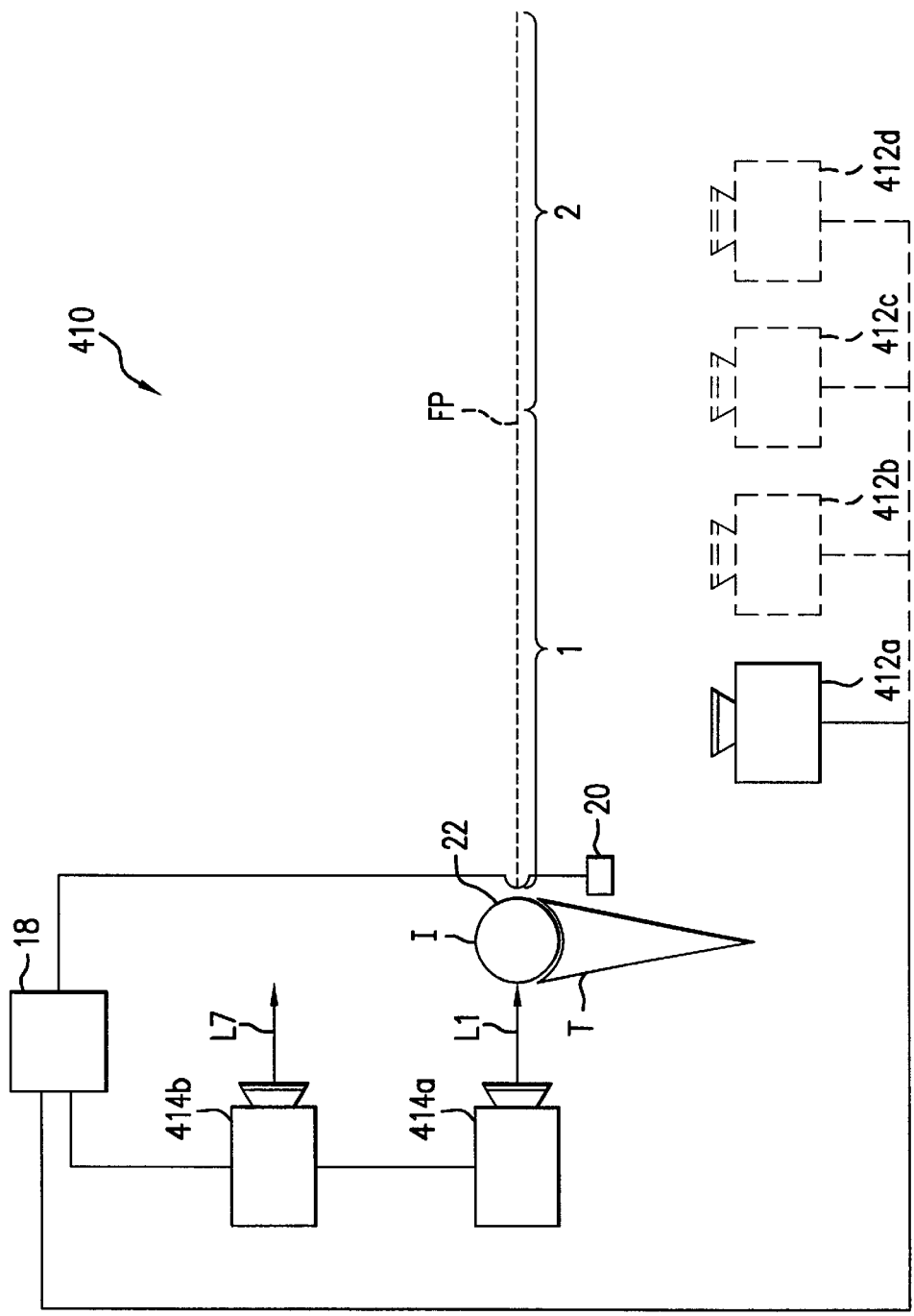
FIG. 9 is a schematic, elevational view of an apparatus for monitoring a golf ball in three dimensions according to a fifth embodiment of the present invention, wherein the golf ball is in an initial position.

Referring to FIG. 9, an alternative apparatus 410 is shown. The apparatus 410 includes two rear cameras 414a–b disposed downstream of the golf ball 22 in the initial position I. Camera 414b is disposed vertically above the camera 414a. In one embodiment, the camera 414a can be located at ground level and the camera 414b can be located about 30 feet above camera 414a using a structure such as the roof of a building to support the camera 414b. Preferably, one of the cameras 414a–b may have a zoom feature to change its focal length so that such camera can track the ball's flight at the end of the flight path. Alternatively, the cameras 414a–b can have different focal lengths so that each camera is responsible for obtaining clear images of the ball along a portion of the flight path. For example, if the focal length for camera 414a is shorter than the focal length for camera 414b, camera 414a obtains clear images of the ball along the first portion 1 of the flight path and camera 414b obtains clear images of the ball along the second portion 2 of the flight path. Alternatively, the cameras 414a–b can be located similarly to cameras 14a and b, as shown in FIG. 1 such that they are in substantially the same horizontal plane.

The system 410 is calibrated and operated similar to system 10 discussed above. Data similar to that calculated with system 310 can be calculated with system 410. System 410 can also include additional cameras 412b–d (shown in phantom). The cameras 412a–d are centrally located within the test range R like the cameras of 310. When the golf ball 22 is launched, rear cameras 114a–b and cameras 112a–d are triggered and images of the ball are captured by the cameras.

Apparatus 410 may be a compact system with minimum video degradation (i.e., video signal degeneration) due to the cameras being located closely together, which minimizes the length of the cables between components.

Figure 10:
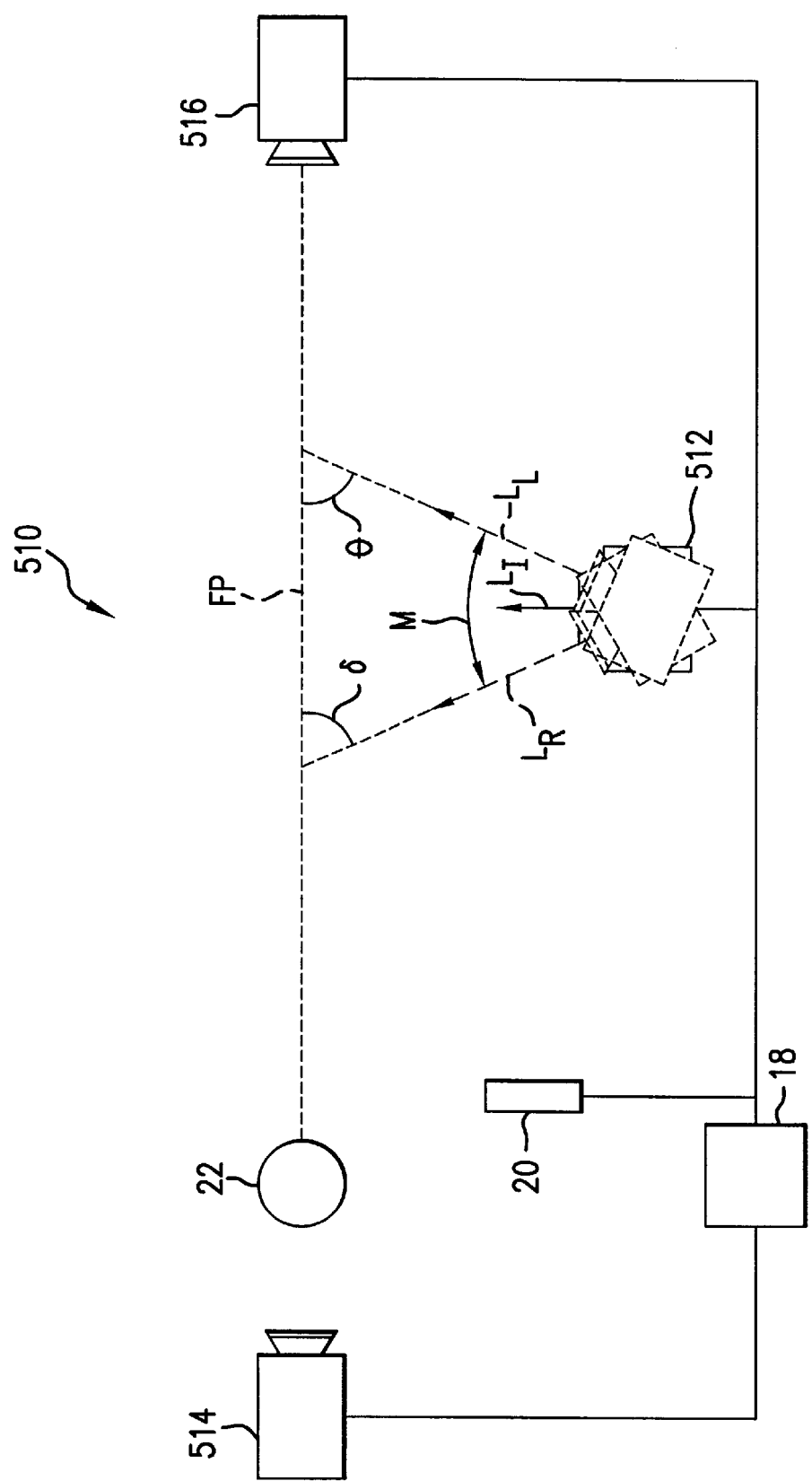
FIG. 10 is a schematic, plan view of an apparatus for monitoring a golf ball in three dimensions according to a sixth embodiment of the present invention, wherein the golf ball is in an initial position.

Referring to FIG. 10, an alternative apparatus 510 is shown. The apparatus 510 is similar to apparatus 110 (shown in FIG. 5) with a single camera 512 disposed along the ball flight path FP. The camera 512 is movable and in its initial position the line of sight $L_I$ is substantially perpendicular or about 90 degrees with respect to the flight path FP of the ball 22. The camera 512 is preferably electronically connected to at least one motor for panning the cameras line of sight between a right position $L_R$ and a left position $L_L$ and/or tilting the camera with respect to a horizontal plane. The line of sight in the right position $L_R$ can have a angle δ to the flight path of the equal to or greater than about 15 degrees, and the line of sight in the left position $L_L$ can have a angle θ to the flight path of the equal to or greater than about 15 degrees.

The motor is controlled by the computer so that the camera 512 tracks the ball as it moves along its flight path. One preferred stepper motor that can be used with the camera 512 is commercially available from Direct Perception, Inc. located in Burlingame, Calif. under model number PTU-46-70. This stepper motor can track ball flight and includes software that can be run by computer 18. In an alternative embodiment, more than one movable camera along the flight path can be used. The movable camera can also be disposed below the turf so long as it can view the ball along the flight path when moved.

The system 510 is calibrated and operated similar to system 10 discussed above with the camera 512 being calibrated in a single position. Data similar to that calculated with system 210 can be calculated with system 510 with a single camera 512 instead of four cameras 212a–d in system 210.

While various descriptions of the present invention are described above, it is understood that the various features of the present invention can be used singly or in combination thereof. For example, the systems above can be used with more than one computer where a computer can be associated with each camera or groups of cameras to minimize cable length and consequently video signal degradation. In addition, the method and apparatus can be used to monitor other objects in flight such as tennis balls, footballs, soccer balls, or baseballs, among others. The features of one embodiment can be used with the features of another embodiment. Therefore, this invention is not to be limited to the specifically preferred embodiments depicted therein.

We claim:

1. Method of monitoring an object in flight, comprising the steps of:
   a. providing at least a portion of an outer surface of the object with a light-emitting material;
   b. allowing the light-emitting material to emit light;
   c. providing at least one first camera with a first line of sight substantially perpendicular to a flight path of the object for capturing images of the ball along a substantial length of the flight path;
   d. launching the object in flight;
   e. transmitting the light toward the at least one first camera so that the at least one first camera captures images at least until the object passes through an apex in flight; and
   f. determining data for the object in flight using the at least one image of the object.

2. The method of claim 1, wherein the step of allowing the light-emitting material to emit light includes exciting the light-emitting material.

3. The method of claim 1, wherein the light-emitting material comprises a phosphorescent material.

4. The method of claim 1, wherein the step of transmitting light further includes each first camera capturing between about two and about 10 images of the object in flight.

5. The method of claim 3, wherein the step of providing at least a portion of the outer surface of the object with the phosphorescent material further includes coating the object with a paint containing a phosphorescent pigment.

6. The method of claim 3, wherein the step of providing at least a portion of an outer surface of the outer surface with the phosphorescent material further includes coating the entire object with the paint.

7. The method of claim 3, wherein the step of providing at least a portion of an outer surface of the object with the phosphorescent material further includes forming a mixture of the phosphorescent material and a cover material and using the cover material to form the outer surface of the object.

8. The method of claim 2, wherein the step of exciting the light-emitting material further includes directing a light at the object.

9. The method of claim 2, wherein the step of exciting the light-emitting material further includes directing an ultra-violet light at the object.

10. The method of claim 8, wherein in the step of directing a light at the object, the light has a wavelength between about 200 nm and about 450 nm.

11. The method of claim 1, wherein the step of providing the at least one camera further includes providing at least one filter associated with each first camera and aligned with a lens of each first camera such that the filter only allows a predetermined range of wavelengths of the light to pass there through.

12. The method of claim 11, wherein the predetermined range of wavelengths is between about 470 nm and about 600 nm.

13. The method of claim 1, wherein the step of determining data for the object further includes providing a computer.

14. The method of claim 4, wherein the step of determining data further includes determining at least one of the following: an object position in three-dimensions, flight time, velocity, velocity decay, spin, spin decay rate, trajectory in three-dimensions, roll distance, carry distance, and dispersion.

15. Method of monitoring an object in flight, comprising the steps of:
   a. providing an object in a stationary position;
   b. providing at least two cameras, the fist camera positioned downstream of the object in the stationary position and the second camera positioned upstream of the object in the stationary position substantially perpendicular to a flight path of the object;
   c. launching the object from the stationary position into flight;
   d. capturing images of the object in flight using the cameras at least until the object passes through an apex in flight; and
   e. determining data for the object in flight using the images of the object.

16. The method of claim 15, wherein the step of determining data further includes determining at least one of the following: an object position in three-dimensions, flight time, velocity, velocity decay, spin, spin decay rate, trajectory in three-dimensions, roll distance, carry distance, and dispersion.

17. The method of claim 15, wherein the step of providing at least two cameras further includes providing two cameras with angularly offset lines of sight offset from about 15 degrees to about 90 degrees.

18. A combination of an apparatus and an object, comprising;
   a. at least one light-emitting object, and
   b. at least one non-light emitting camera located substantially perpendicular to a flight path of the object to receive a light emitted from the object in a predetermined range of wavelengths and used the light to produce at least one image of the object in flight at a location at least through an apex of the object in flight.

19. The combination of claim 18, further including at least one filter located to receive the light emitted from the object so that the camera receives filtered light.

20. The combination of claim 18, wherein the predetermined range of wavelengths is between about 500 nm and about 600 nm.

21. The combination of claim 18, wherein at least a portion of an outer surface of the object includes a phosphorescent material.

22. The combination of claim 18, further including at least one first camera with a first line of sight substantially perpendicular to a flight path of the object and at least one second camera with a second line of sight angularly offset from the first line of sight.

23. The combination of claim 22, wherein the at least one first camera is disposed above a turf surface.

24. The apparatus of claim 22, wherein the at least one first camera is disposed below a turf surface.

25. The apparatus of claim 22, further including at least two first cameras with first lines of sight substantially perpendicular to the flight path.

26. The apparatus of claim 22, further including providing at least two second cameras with second lines of sight angularly offset from the first line of sight.

27. The apparatus of claim 22, wherein the second cameras are downstream of the flight path.

28. The apparatus of claim 26, wherein the second cameras are vertically spaced apart.

29. The apparatus of claim 26, further including providing one second camera upstream of the flight path and the remaining second camera downstream of the flight path.

30. The apparatus of claim 27, further including at least four spaced apart first cameras with first lines of sight substantially perpendicular to the flight path.

31. The apparatus of claim 18, further including at least one computer electrically connected to each camera.

32. The apparatus of claim 31, further including at least one frame grabber electrically connected to the computer for controlling each camera.

33. An apparatus for monitoring an object in flight, comprising:
   a. at least one movable camera for taking images of the object during flight;
   b. at least one stationary camera for taking images of the object during flight; and
   c. at least two filters located to receive a light emitted from the object before transmission to the associated camera, the filter allowing the light to enter the associated camera and capture at least one image of the object in flight for each camera.

34. The apparatus of claim 33, wherein the movable camera has a first line of sight at a first angle to a flight path of the object and the stationary camera has a second line of sight at a second angle to the flight path of the object, wherein the first and second angles are substantially different.

35. The apparatus of claim 34, wherein the first angle is about 90 degrees and the second angle is about 15 degrees.

36. An apparatus for monitoring an object in flight, comprising:
   a. at least one first camera with a first line of sight substantially perpendicular to a flight path of the object for capturing images of the object along a substantial length of the flight path;
   b. a second camera with a second line of sight angularly offset from the flight path of the object by less than about 90 degrees;
   c. at least one first filter associated with each first camera located to receive a light emitted from the object before transmission to the associated first camera, the at least one first filter allowing the light to enter the associated first camera and allowing the associated first camera to capture at least one image of the object in flight; and
   d. a second filter located to receive the light emitted from the object before transmission to the second camera, the second filter allowing the light to enter the second camera and allowing the second camera to capture at least one image of the object in flight.

* * * * *